April 30, 1957
C. J. HILL ET AL
2,790,415
POULTRY DISINFECTING PERCH
Filed Jan. 9, 1956
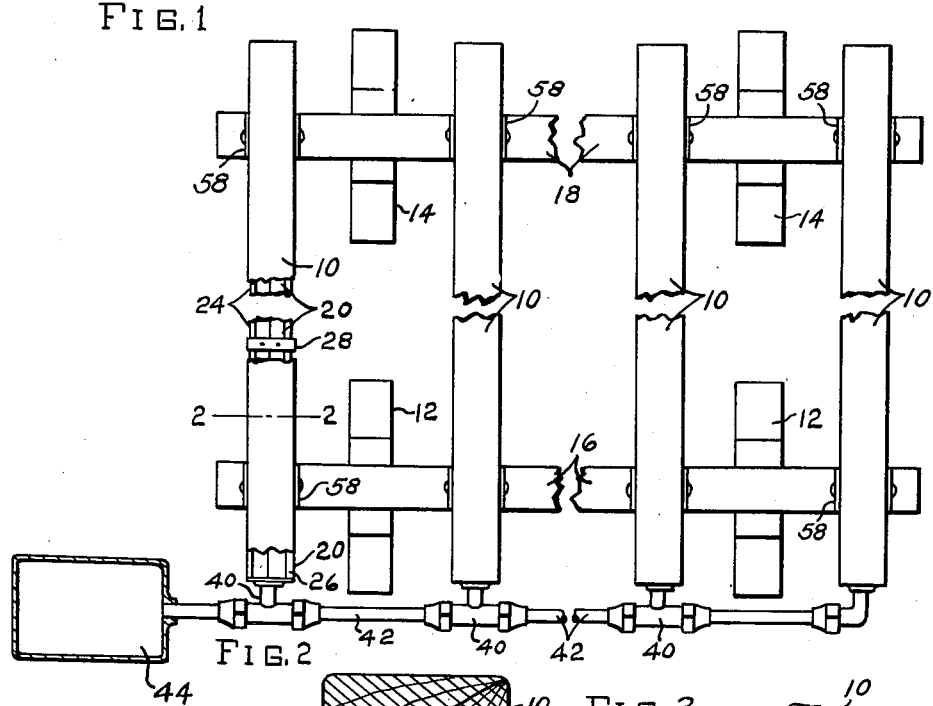
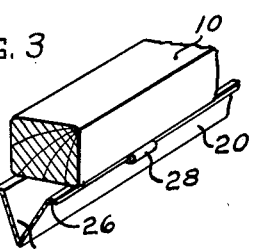
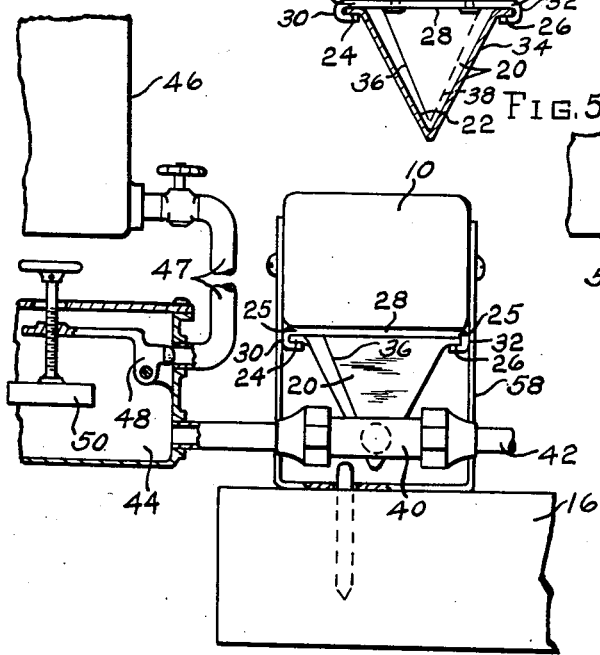
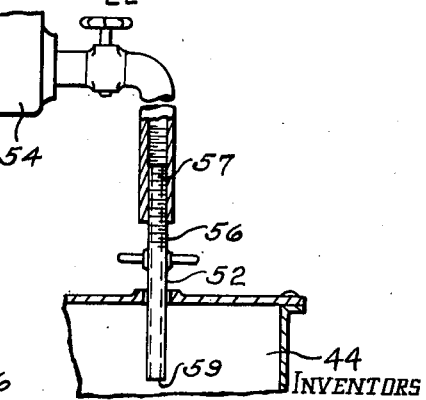
INVENTORS
CHARLES J. HILL
CLARENCE E. HILL
BY
ATTORNEY

United States Patent Office 2,790,415
Patented Apr. 30, 1957

2,790,415

POULTRY DISINFECTING PERCH

Charles J. Hill and Clarence E. Hill, Rochester, N. Y.

Application January 9, 1956, Serial No. 557,942

4 Claims. (Cl. 119—25)

This invention relates to poultry roosts, and more particularly to a means for disinfecting poultry perched thereon.

The invention is more particularly directed to a poultry roost in which provision is made for providing a continuous and controlled supply of disinfectant vapor in the region of the roost to kill lice and other parasites with which poultry become infected.

An object of the invention is to provide poultry roosts with a continuous supply of disinfectant vapor adapted to rise on either side of the roost to rid poultry perched thereon of such parasites. A further object of the invention is to provide a disinfectant supply and vapor escape means that are continuously protected from poultry droppings, and which may be readily controlled as to vapor intensity. A further object of the invention is to provide vapor disinfecting means for poultry which will be effective, economical to continuously operate, and of low cost for initial installation.

The above and other objects and features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a plan view of a series of poultry roosts to which the invention is applied, with parts broken away;

Figure 2 is a section taken substantially on the line 2—2 of Figure 1, through one of the roosts;

Figure 3 is a perspective fragmentary view partly in section of a roost, with the disinfectant supply means attached thereto;

Figure 4 is an end elevational fragmentary view of a roost, and disinfectant supply means, the latter shown partly in section; and Figure 5 is a fragmentary, partly in section, view of an alternative disinfectant supply means.

In Figure 1 there is shown a plurality of roosts or rails 10, supported in trestles 12 and 14 having support bars 16 and 18. Each of the bars is laid level upon the trestles and are provided, along the underside with troughs 20 to hold a supply of disinfectant, in liquid form. Each trough extends substantially the length of the roost or bar, and comprises a V sectional channel 22, with lateral flanges 24 and 26 extending from the upper edges. The troughs are hung from the bars by transverse straps 28 which are nailed or otherwise secured to the underside of the roost rails, as shown in Figure 2, and the free ends 30 and 32 of such straps are bent around and under the flanges 24 and 26. The straps may be of sheet metal, and disposed along the length of the bars, with such spacing as to provide a sufficient number of straps to adequately support the troughs.

The thickness of the straps, provides lengthwise vents extending along the length of the troughs, such vents 25 being defined by the upper surface of the flanges 24 and 26, and the under surface of the bars, the width of such vents being determined by the thickness of the metal from which the straps are made. The straps provide a convenient and economical means for attachment of the trough, and should cleaning or replacement of a trough be required, one of the ends 30 of each of the straps may be straightened sufficiently to permit removal of the trough, if necessary for any purpose. The vertical width of the vents thus provided are held substantially uniform along the entire length of the trough, and the escape of vapor is thus uniformly controlled on both ends of the bar. The troughs are closed at either end in any suitable manner. If desired, the material forming the side walls 34 of the trough may be interfolded at the ends as indicated at 36 and 38 to form the end, thus avoiding any necessity for a seam.

Each of the troughs at one end is provided with a T 40 which is connected together by a manifold 42 leading to a reservoir such as 44. The reservoir is fed from a supply 46 of disinfectant, through a supply pipe 47, and a float valve 48, having an adjustable float 50. By adjusting the liquid level in the reservoir 44, the level of the liquid in the troughs, all of which are arranged horizontal and at the same level, may be controlled. The rate of evaporation, or vapor formation, will vary in accordance with the level maintained in the troughs by reason of the V section. A high level provides an extended surface area promoting increased vaporization, whereas a low level in the troughs, reduces the surface area of disinfectant and decreases the vaporization rate. Thus by adjusting the float, to vary the level in the reservoir, the liquid level and vaporization rate can be nicely controlled, so that economy of operation can be had.

The chamber 44 may be fed by a supply pipe, such as 52 shown in Figure 5, wherein the supply tank 54 is airtight. Such supply pipe may have an adjustable nipple 56, threaded as shown at 57 so that the liquid level in the reservoir can be adjusted, together with the liquid level in the troughs. As liquid covers the lower end of the nipple 56, to prevent ingress of air into the nipple and the supply tank 54, flow is stopped. As soon as the liquid level uncovers the lower end of the nipple, air enters the nipple, and the tank 54, permitting the level of the reservoir 44 to be restored to the level of the lower end 59 of the nipple. By suitably adjusting the nipple, any desired level can be established in the troughs.

The roosts, or bars may be supported above the trestles, on U members 58, to provide clearance for the troughs, or the transverse trestle bars 16 and 18 may be notched to receive the troughs. It is of importance, however, that the troughs all be horizontal, and also of a like level if a common reservoir is used.

It will be seen that the troughs are completely protected from foreign matter, and that the vapor slots 25 are protected from droppings, so that the vapor is at all times free to escape through the side slots, and continually rise to effectively kill and control the parasites on poultry perched on the roosts.

While a single form of the invention with variation has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A poultry roost vapor disinfecting apparatus comprising a horizontally disposed roost rail of generally rectangular section, a V section open trough extending substantially the length of said rail and attached to the underside of said rail, said trough being entirely beneath said rail so as to be protected thereby from foreign matter means for spacing the upper edges of said trough from the underside of said rail to provide uniform lengthwise extending vapor vents defined by the upper edges of said trough and the underside of said rail, on both sides of said trough, a liquid level control chamber connected to said trough, and means for supplying liquid disinfectant to said chamber and for maintaining a predetermined liquid level therein, said chamber being mounted at the same height as said trough, whereby the level of disinfectant in said trough may be maintained at a predetermined level.

2. A poultry roost vapor disinfecting apparatus comprising a horizontally disposed roost rail of generally rectangular section, a V section open trough extending substantially the length of said rail and attached to the underside of said rail, said trough being entirely beneath said rail so as to be protected thereby from foreign matter means for spacing the upper edges of said trough from the underside of said rail to provide uniform lengthwise extending vapor vents defined by the upper edges of said trough and the underside of said rail, on both sides of said trough, and means for maintaining a predetermined level of disinfectant in said trough.

3. A poultry roost vapor disinfecting apparatus comprising a horizontally disposed roost rail of generally rectangular section, a V section open trough extending substantially the length of said rail and attached to the under side of said rail, said trough being entirely beneath said rail so as to be protected thereby from foreign matter means for spacing the upper edges of said trough from the underside of said rail to provide uniform lengthwise extending vapor vents defined by the upper edges of said trough and the underside of said rail, on both sides of said trough, means for varying the level of disinfectant in said trough, and for maintaining a predetermined selected level, whereby the evaporation surface of liquid in said trough may be varied to control the rate of evaporation.

4. A poultry roost vapor disinfecting apparatus comprising a horizontally disposed roost rail of generally rectangular section, a V section open trough having lateral upper edge flanges extending substantially the length of said rail and disposed beneath said rail, said trough being entirely beneath said rail so as to be protected thereby from foreign matter means for spacing the upper edges of said trough from the underside of said rail to provide uniform lengthwise extending vapor vents defined by the upper edges of said trough and the underside of said rail, said means comprising transverse narrow plates secured to said rail, and having opposite ends reversely bent around said flanges on both sides of said trough, a liquid level control chamber connected to said trough, and means for supplying liquid disinfectant to said chamber and for maintaining a predetermined liquid level therein, said chamber being mounted at the same height as said trough, whereby the level of disinfectant in said trough may be maintained at a predetermined level.

References Cited in the file of this patent
UNITED STATES PATENTS

| | | |
|---|---|---|
| 107,448 | Chandler | Sept. 20, 1870 |
| 579,821 | Elliott | Mar. 30, 1897 |
| 1,154,392 | Hagan | Sept. 21, 1915 |
| 1,632,234 | Kalvig | June 14, 1927 |